Sept. 1, 1936.                H. A. BANKS                2,053,124
                            PRICE TAG HOLDER
                          Filed March 8, 1935
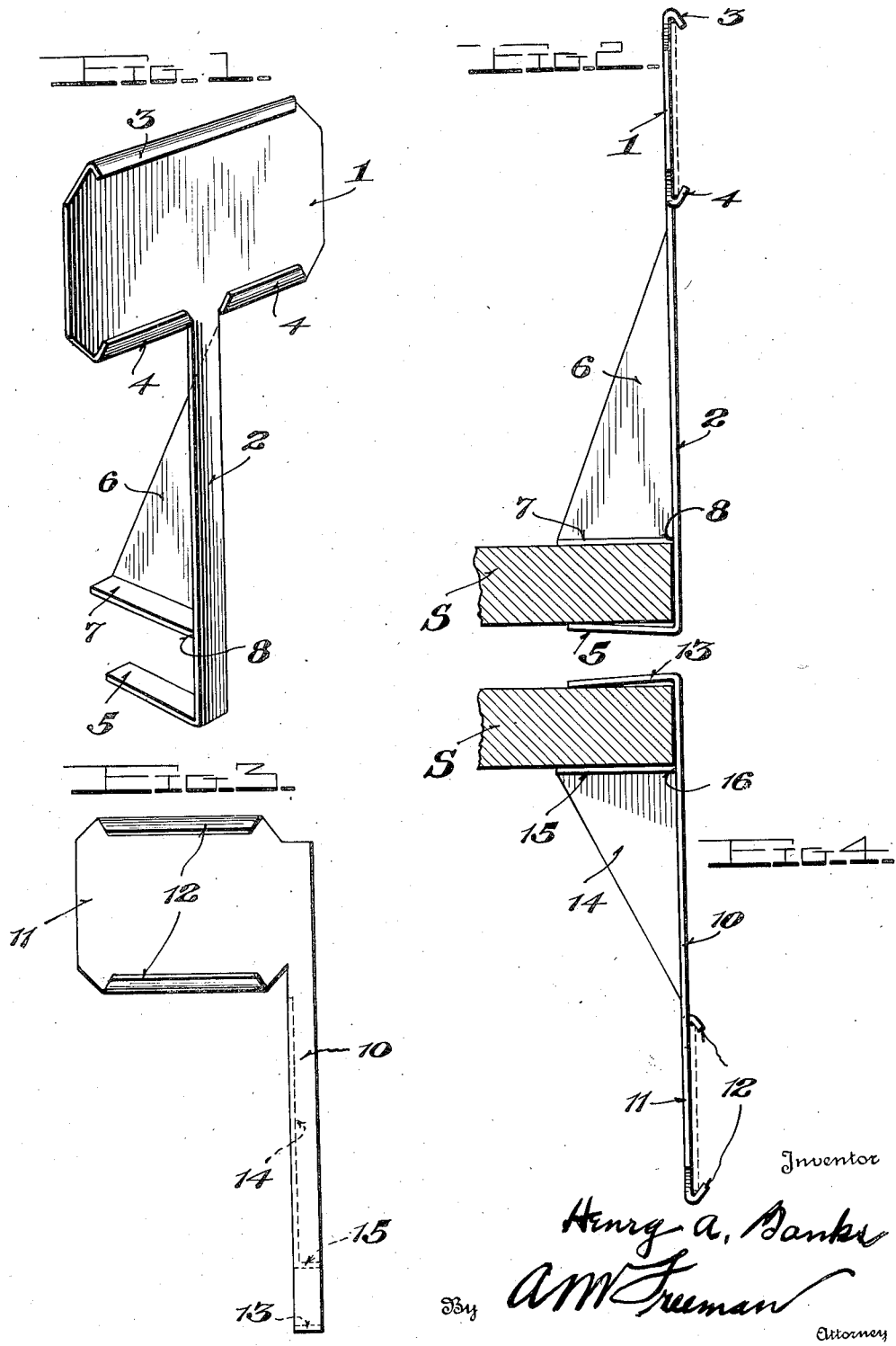
Inventor
Henry A. Banks
By A. W. Freeman
Attorney Patented Sept. 1, 1936

2,053,124

UNITED STATES PATENT OFFICE 2,053,124

PRICE TAG HOLDER

Henry A. Banks, Sioux Falls, S. Dak.

Application March 8, 1935, Serial No. 10,082

2 Claims. (Cl. 248—28)

This invention relates to price tag holders and the primary object thereof is to provide a holder of this type which can be made of a single piece of metal, and which is of simple, economical construction and efficient in operation.

A further object of this invention is to provide a holder of this type, which involves a novel form of jaw construction whereby same is effectively braced so as to resist accidental displacement, and to also more firmly secure the holder on a shelf or the like.

The invention has further and other objects which will later be set forth and manifested in the course of the following description.

In the drawing:

Fig. 1 is a perspective view of one form of the invention;

Fig. 2 is a side elevation of Fig. 1 showing same applied to a shelf;

Fig. 3 is a front elevation of another form of the invention and

Fig. 4 is a view simliar to Fig. 2 showing the holder of Fig. 3 applied to a shelf in depending relation thereto.

In proceeding in accordance with the present invention the holder is preferably stamped or formed out of a single sheet of metal or may be constructed of other suitable material, and includes a head 1 having a shank 2 extending outwardly from a side of the head and which as shown in Fig. 1 is located at the center of the head. The top side of the head is flanged inwardly at 3 and the bottom side of the head on the opposite sides of the shank 2 is likewise flanged at 4, 4 so that these flanged parts form guides in which a price tag or the like may be easily inserted and removed. Further as shown in Fig. 1 the lower end of the shank is bent inwardly at 5 to form a shelf engaging jaw depicted in use in Fig. 2. One of the side edges of the shank 2 is provided with an integral extension or web 6 preferably of triangular form, that is to say, it tapers downwardly and rearwardly from the top portion of the shank and is disposed at right angles of the plane of the shank. The lower edge of the extension 6 is extended inwardly at right angles to form a shelf engaging jaw 7, the latter overlying and being spaced from the jaw 5 but preferably in registry therewith. Referring to Fig. 2 it will be noted that the inner end 8 of the jaw 7 abuts the rear face of the shank 2 and is braced thereby. Consequently it will be seen that any pressure exerted rearwardly of the shank will be assumed by the extension 6 which forms a brace for the jaw 7.

In Fig. 3 of the drawing the construction of the parts is identical to that described in Figs. 1 and 2, with the exception that the shank 10 is located at one side of the head 11 and the latter has a pair of similar inturned flanges 12 to form guides to receive a price tag or card or the like. In this form of the invention, the jaw 13 is likewise formed by inturning the free end of the shank 10 and the brace 14, which has the other jaw 15 secured thereto, is identical to the corresponding parts 6 and 7 in Figs. 1 and 2. Likewise the end 16 of the jaw 15 abuts the shank 10 to be braced thereby.

From the foregoing it will be apparent that, and as shown in Figs. 2 and 4, either form of the invention may be secured in upstanding relation to a shelf S as shown in Fig. 2, or in depending relation to the shelf as shown in Fig. 4. It is is further to be noted that the jaws 5 and 13 are readily bendable so as to enable the holder to be used with shelves within a reasonable range of thickness.

What is claimed is:

1. A price tag holder including a shank having means to retain a price tag at one end portion thereof, and having its opposite end disposed at an angle to form a shelf-gripping jaw, one of the side edges of the shank having an integral extension which extends in the direction of the jaw and having a lower portion which is disposed at right angles to the extension to form a jaw which is substantially in register with and spaced from the first jaw.

2. A price tag holder including a shank having means to retain a price tag and having a free end disposed at an angle to form a shelf-gripping jaw, one of the side edges of the shank having an integral triangular extension which is disposed in the direction of said jaw, the base of the triangle of the extension being in turn formed with an integral substantially right angular extension to form a shelf-gripping jaw which cooperates with the first named jaw and which has a free inner end that confronts the shank.

HENRY A. BANKS.